May 20, 1958 J. A. JUPA 2,834,992
INJECTION MOLDING OF PERFLUOROCHLOROCARBON PLASTICS
Filed July 28, 1954
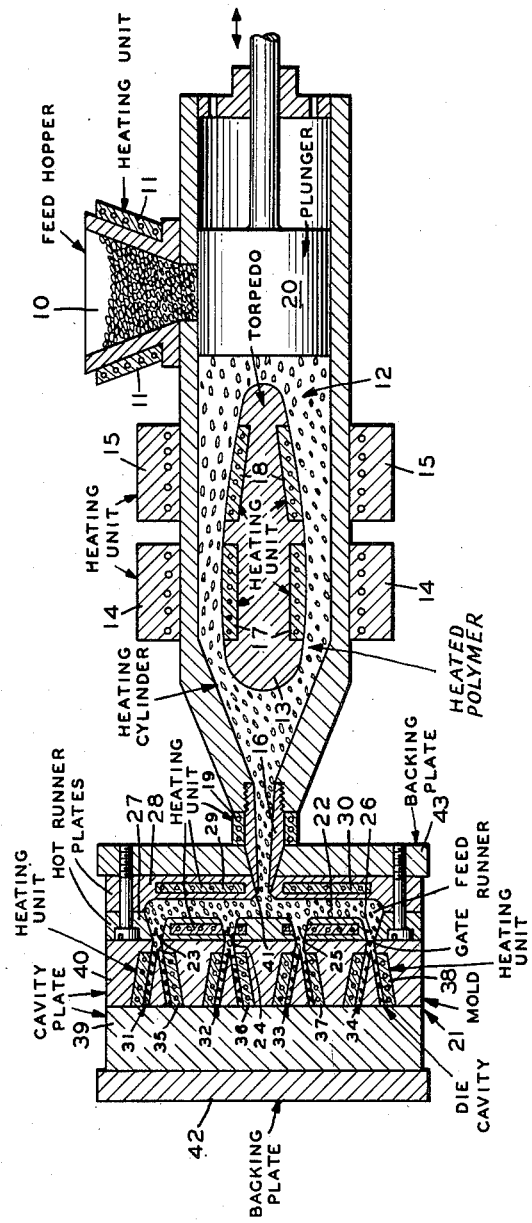
INVENTOR
JULIUS A. JUPA
BY G. A. Palmer
Benjamin J. Kaufman
ATTORNEYS

United States Patent Office 2,834,992
Patented May 20, 1958

2,834,992

INJECTION MOLDING OF PERFLUOROCHLOROCARBON PLASTICS

Julius A. Jupa, Elizabeth, N. J., assignor, by mesne assignments, to Minnesota Mining and Manufacturing Company, St. Paul, Minn., a corporation of Delaware Application July 28, 1954, Serial No. 446,334

2 Claims. (Cl. 18—55)

This invention relates to the treatment of perfluorochlorocarbon plastics, and more specifically to the treatment of polytrifluorochloroethylene plastics. In one aspect, the invention relates to the injection molding of polymers of trifluorochloroethylene for the purpose of forming articles of such material. More particularly in this aspect, the invention relates to the injection molding of polymers of trifluorochloroethylene for the purpose of forming articles of such material.

As an accumulative group, polymers of trifluorochloroethylene offer wide utility in various industrial applications, serving not only as substitutes for natural rubber, but, in some instances, these polymers are superior to the natural products, e. g., in physical strength, resiliency, and in high chemical stability. Four-fifths of the weight of polytrifluorochloroethylene is made up of fluorine and chlorine. The plastic form of trifluorochloroethylene is colorless and transparent, and possesses a high chemical stability, with no effect being observed on the plastic polymer after prolonged exposure to hydrofluoric acid, hydrochloric acid, and strong caustic solutions, as well as fuming nitric acid, aqua regia and other vigorous oxidizing materials. The plastic form of this polymer exhibits high physical strength, flexibility, and resilience, and is not affected by water or by humidity. In this respect, it has been found that the polymer is hard but not brittle and is flowable at temperatures above about 500° F. With particular reference to the utility of these trifluorochloroethylene plastic polymers, various molded articles, can be produced from these polymers, by injection molding techniques, in the form of insulating or coating compositions, gaskets, and other articles of manufacture, and particularly those molded articles, produced from multi-cavity dies associated with the injection molding apparatus.

Polytrifluorochloroethylene thermoplastic, being a relatively high molecular weight thermoplastic material, exhibits a high viscosity, and therefore, possesses rather poor flow characteristics during the molding operation. In effect therefore, when polytrifluorochloroethylene thermoplastic polymers are subjected to injection molding techniques, it is essential that the thermoplastic material be maintained at a temperature which is just below the temperature of rapid degradation, and that pressures be maintained sufficiently high to force the plastic material into the die cavity, having the size and shape of the final product. If the material is not in a condition of substantially complete plasticization, or drops below the transition or conversion temperature while being introduced into the die cavity, excessive orientation of the polymer molecules along the axis of the resulting molded article (corresponding to the line of flow of the polymer material as it emerges from the gate), takes place.

It has been found that the above-mentioned excessive orientation arises from the application of high shearing stress to semi-molten polymer chains by forcing them through relatively narrow channels. The mechanism of orientation is such that short, low molecular weight chains are more easily aligned along the direction of stress than are long, high molecular weight chains. This may be more readily understood, if one considers, from a physical standpoint, that long molecules are apt to be more completely intertwined than short molecules.

Orientation in the finished injection molded article, has been found to result in an isotropic mechanical behavior, i. e., the tensile strength perpendicular to the fiber axis is lower than the tensile strength parallel to the axis, in the finished molded article. In the case of highly oriented finished articles, such as conical structures produced by the injection molding technique, the direction of the low tensile strength coincides, in many instances, with the radial direction of high stress. Accordingly, it has been found that in many instances where these molded articles are subjected to structural stresses in performing their function, such stresses often result in the formation of cracks or other similar defects, impairing the efficiency of the article or rendering it entirely unfit for use.

It is, therefore, an object of this invention to provide an improved method of injection molding, adapted to the forming of articles of polymers of trifluorochloroethylene, which will be free from cracks or other forms of structural deterioration when subjected to stresses or strains in performing their functions.

Another object of the invention is to provide suitable apparatus for carrying out an improved method of injection molding, adapted to the forming of articles of polymers of trifluorochloroethylene, which will be free from cracks or other forms of structural deterioration when subjected to stresses or strains in performing their functions.

Various other objects and advantages inherent in the invention, will become apparent to those skilled in the art from the following description and disclosure.

In seeking to eliminate or substantially minimize the aforementioned orientation and material breakdown in articles comprised of polytrifluorochloroethylene thermoplastic produced by conventional injection molding techniques, it was found that such deleterious orientation was largely avoided or reduced, and that crack-free finished articles were obtained when the injection molding was carried out in a single-cavity die operation. On the other hand, as indicated above, when the injection molding of this thermoplastic material is carried out under the same conditions of temperature, pressure, and molding rate employing a multi-cavity die operation, high orientation in the finished article takes place, and subsequent cracking or deterioration as a result of stresses set up in the molded article in the course of performing its function, results.

With the above in mind, it was found that this significant difference in the reduction, or substantial elimination, of orientation in the finished article, between single-cavity and multi-cavity die operations, results from incomplete plasticization of the trifluorochloroethylene thermoplastic in dropping below the transition temperature whlie flowing through sprues, runners, gates, etc., into the die cavities, when multi-cavity die operations are employed. In the case of a single-cavity die operation, because of the shorter distance that the thermoplastic shot has to travel, there is no appreciable drop in temperature, and hence the material is kept above the transition temperature and enters the die-cavity in a sufficiently highly plasticized condition to avoid any substantial orientation. To achieve similar results when employing multi-cavity die operations in carrying out the injection molding of polytrifluorochloroethylene thermoplastic materials, the method and apparatus hereinafter described, is employed and results in maintaining the thermoplastic material in a highly plasticized condition throughout its course from the initial heating chamber, through the sprues, runners, gates, etc., into the multi-cavity die, and thus substantially eliminates undesirable orientation in the final molded article.

In accordance with the present invention, a thermoplastic material comprising a polymer of trifluorochloroethylene, is subjected to an injection molding procedure, by first heating the thermoplastic material in an injection chamber to a temperature between its transition point and not higher than about 700° F. This heated material is then injected through a nozzle, which is maintained at a temperature between about the average temperature of the thermoplastic material in the injection chamber and not higher than about 700° F., into a die equipped with heated passageways or runners and reservoirs, which are maintained at a temperature between the transition point of the thermoplastic material and below the temperature of substantial degradation. This heated material is then passed from the heated die passageways or runners into respective die cavities, maintained at a temperature more than about 25° F. below the transition temperature of the thermoplastic material. The invention, therefore, comprises the aforementioned several steps and the relation of each of these steps with respect to each of the others thereof, and will be exemplified in the process hereinafter discussed. It will be understood that the herein-described improved injection molding process is applicable to thermoplastic materials containing all or a substantial quantity of polytrifluorochloroethylene, having no-strength-temperatures as indicated in the ranges hereinafter discussed.

The transition or conversion point of thermoplastic trifluorochloroethylene polymers, is the temperature at which an opaque or powdered sample of the material becomes transparent as it is being heated. This temperature is substantially constant at 415° F., plus or minus about 5 degrees Fahrenheit, for normally solid polymers having an N. S. T. between about 200° C. and about 350° C., and can be determined by heating the thermoplastic sample under pressure between the platens of a press. Thus, with these polymers, the no-strength-temperature may vary; however, the transition temperature remains the same. When a solid trifluorochloroethylene thermoplastic polymer is plasticized, both the no-strength-temperature and the transition point are lowered, this being the one instance in which the transition temperature is changed. Insofar as the determination of the N. S. T., as an indication of the molecular weight of the trifluorochloroethylene polymers, is concerned, the N. S. T. test is well known to those skilled in the art, and is widely described in patent literature and texts, and is, therefore, believed to require no further elaboration.

As indicated above, the thermoplastic material comprising a polymer of trifluorochloroethylene is heated in the injection chamber to a temperature between its transition point and about 700° F. In this respect, it should be noted that trifluorochloroethylene polymers, when heated to excessive temperatures, undergo thermal degradation or decomposition in which the individual molecules are cracked or depolymerized to lower polymers. This degradation does not appear to commence until the temperature has risen above approximately 550° F. As the temperature rises further, the decomposition rate continues to increase and the desirable properties of the thermoplastic material are lost, unless the exposure to the higher temperature is extremely brief. Therefore, although the thermoplastic material may be heated in the injection chamber to a temperature as high as about 700° F. for a few seconds without substantial degradation, it is generally undesirable to maintain trifluorochloroethylene polymers, whose N. S. T. is between about 200° C. and about 350° C., above 550° F. for periods longer than a few minutes. The preferred method for handling the trifluorochloroethylene thermoplastic material in the injection chamber, is to heat this material to a temperature between its transition point and about 550° F.; and the most desirable results have been found to be obtained when the material is heated in the injection chamber at a temperature between about 475° F. and about 550° F.

Preheating of the polytrifluorochloroethylene thermoplastic material, prior to its heat tretment in the injection chamber, is an optional but desirable step. For this purpose, the thermoplastic material may be preheated to temperatures between about 200° F. and about 300° F. This preheating treatment may be performed either in a separate oven, or in the feed-hopper of the injection apparatus, by providing the latter with any suitable heating means.

As indicated above, the heated material from the injection chamber, is next injected through a nozzle into the die passageways or runners, where multi-cavity dies are employed (and may also be injected into the passageway or runner of a single cavity die, if so desired). In this respect, the nozzle, which is equipped with suitable heating means, is maintained at a temperature between about the average temperature of the material in the injection chamber and about 700° F. Here, also, it will be noted that employing temperatures, substantially above 550° F. will result in some degradation or cracking of the polymer and, therefore, it is undesirable to maintain temperatures within the nozzle between the degradation range of 550° F.–700° F. for periods longer than a few minutes. The importance of heating the nozzle is to insure maintenance of the heated thermoplastic material, from the injection chamber, at a chosen temperature, approximately equal to, or somewhat higher than, that present in the injection chamber itself. A preferred method of operation, is found to be obtained when the heated material from the injection chamber is injected through a nozzle maintained at a temperature between at least about 50° F. above the average temperature of the material in the injection chamber and about 550° F.

For this purpose, the heated material from the injection chamber, is injected, as indicated above, through the heated nozzle into the die runners, which are maintained at a temperature between about the transition point of the thermoplastic material and below the temperature of substantial degradation, (e. g., 550° F.). This latter temperature, insofar as the die passageways or runners, are concerned, is maintained not only on the main runners or passageways, but also on the connecting feed-runners, and gates as well. It will, therefore, be seen that the aforementioned operation, and maintenance of the indicated temperature conditions, has the effect of having the injection chamber acting as a preconditioner to gradually bring the thermoplastic material up to a temperature which will plasticize this material without excessive degradation; and having final plasticizing taking place in the heated runner system, just prior to injection of the thermoplastic material into the mold die cavity itself.

As indicated above, the heated thermoplastic polytrifluorochloroethylene material is passed from the heated die passageways or runners into respective die cavities. Within these die cavities the material is maintained at a temperature sufficiently below the transition temperature so that the thermoplastic material may assume the size and contour of the die cavity and form the desired article. For this purpose, the die cavity is maintained at a temperature which is below the aforementioned transition temperature and about 225° F. In general, in practical operations, the die cavity should be maintained at a temperature which is more than about 25° F. below the transition temperature of the thermoplastic material. A preferred operating range for the die cavity is between about 275° F. and about 350° F. At the aforementioned temperatures, the heated material, transferred from the hot die runners, loses its plasticity, but at a rather slow rate, so that its hardness, brittleness and crystallinity, are not impaired.

Thermoplastic materials containing polymers of trifluorochloroethylene, are amenable to heat treatment at temperatures which range from their transition points down about 115 degrees lower, i. e., from about 300° F. to about 415° F., for solid polymers having N. S. T.'s between about 200° C. and about 350° C. Maintaining the thermoplastic material within this temperature range for a sufficient period, will increase its hardness, brittleness, opacity and crystallinity. This treatment is found to proceed quite slowly in the lower half of the aforementioned temperature range. Therefore, only the upper portion of the range from the transition point down about 60 degrees therefrom, is of primary importance.

The first 25° F. below the transition temperature of the thermoplastic trifluorochloroethylene material is the most critical range, and advantage is taken of this to select the characteristics of the finished molded article, by rapidly cooling or quenching the article through this range to increase its flexibility, transparency and toughness. A quenched molded article may be heat-treated later by reheating it within the aforementioned temperature range to promote hardness and opacity. In order to obtain the optimum control of the hardening treatment at practical heat-treating rates (usually less than about 24 hours), it is preferred to reheat the article to temperatures between about 20° F. to about 40° F. below the transition point. In comparison with a slowly cooled or heat-treated article, a quenched article has the appearance of a plasticized product without sacrifice of chemical inertness. Almost perfectly transparent articles, substantially free of deleterious orientation, up to ¼ inch in thickness may be produced by quenching; but those articles of increasing thickness become more and more translucent, due to the insulating qualities of the thermoplastic material and the resulting slower cooling of the inner portions. Polymers of low N. S. T. values may be heat-treated at lower temperatures than the higher N. S. T. polymers, and the rate of hardening of lower N. S. T. polymers is faster at any given temperature. The dimensional stability of the trifluorochloroethylene thermoplastic material can be enhanced by annealing the molded article at about 250° F. for about 24 hours.

The accompanying drawing is an elevational view, partly in cross-section, showing an example of the improved injection molding machine for carrying out the injection molding of the thermoplastic material comprising a polymer of trifluorochloroethylene, in accordance with the present process. As hereinafter described, the injection molding operation is carried out in a different manner from that commonly employed for other thermoplastic materials, which are less viscous and possess better flow properties than trifluorochloroethylene thermoplastic polymers. It should be noted that the arrangement for heating the apparatus at the various points indicated, may be modified, if so desired, to provide varying temperatures and application of heat at additional points. For best results, the injection molded machine should be provided with adequate temperature control equipment, particularly where temperatures in the higher regions of the stated ranges are employed in the molding operation.

As previously indicated, the polytrifluorochloroethylene thermoplastic material (which may contain plasticizing agents, solid fillers, or coloring agents, if so desired) is preferably preheated to a temperature between about 200° F. and 300° F. prior to the molding operation. While this preheating may be performed within an oven, external to the injection molding apparatus, it is preferred that the material be preheated in feed-hopper 10, by providing the latter with any suitable heating means, such as heating unit 11. The thus preheated polytrifluorochloroethylene plastic is next fed into the injection chamber or cylinder 12. This chamber is provided with a torpedo or separator 13, which is concentrically located in the heating chamber 12 in order to bring the thermoplastic material into closer contact with the heated chamber wall.

In the heating chamber 12, the thermoplastic material is heated (in a preferred modification) to a temperature between the transition temperature and about 550° F. An optimum operating range within this heating chamber will be found to reside between about 475° F. and about 550° F. In order to maintain the desired temperature within the heating chamber, chamber 12 may be provided with a single heating element; however, it is more desirable to have two or more heating means present, such as heating units 14 and 15, in order that the temperature increase in the heating or injection chamber will be more gradual, and the material will not be held at its maximum temperature any longer than is necessary. It should be noted, however, that the thermoplastic material must have been heated to its transition temperature by the time it reaches nozzle 16. When employing the two heating elements 14 and 15, it is preferred to maintain the rear half or entrance section of the heating cylinder between about 300° F. and about 450° F., while the exit section or front half of the injection or heating chamber is kept at a temperature between the transition temperature of the molding material and about 550° F., although temperatures as high as about 700° F. may also be employed for short periods of time.

In order that the molding material may be more uniformly heated in injection chamber 12, it is desirable to provide one or more heating elements such as heating units 17 and 18, for the torpedo or separator 13. Since nozzle 16, as indicated above, is maintained at a temperature between about the average temperature of the material in the injection chamber, and preferably at least about 50° F. above the average temperature in this chamber and the temperature of decomposition, it is preferred that nozzle 16 be equipped with a separate heating element 19, in order to maintain an independently controlled temperature. Where an extremely long molding cycle is being used, or where there are frequent halts in operation, any overheated or degraded material in nozzle 16 can be be removed therefrom with a short stroke of plunger 20. Preferably, several thermocouples are provided in various locations throughout the injection machine as a precaution against local overheating of the thermoplastic material.

As previously indicated, the heated material from the injection chamber 12 is injected through the heated nozzle 16 into a specially constructed injection molding die 21. The heated material is first injected (where a multicavity die is employed, such as is shown in the drawing) into a main runner 22 and is forced from main runner 22 into respective feed runners, such as 23, 24, 25 and 26, as shown in the drawing. As previously indicated, both the main runner and the feed runners are maintained at the desired temperature which will vary between about the transition point of the thermoplastic material and below the temperature of substantial degradation, (e. g., 550° F.). Likewise, this same temperature will also be maintained on the respective gates connecting with the feed runners. In order to maintain the desired temperature on the main runners, feed runners and gates, hot-runner plates 27 and 28, in which the aforementioned passageways and runners are enclosed, are equipped with suitable heating means, such as cal-rod units 29 and 30.

The heated thermoplastic material from feed runners 23 through 26 is next passed through the respective gates into respective die cavities 31, 32, 33 and 34 in cavity plates 39 and 40. As indicated above, the die cavities are preferably maintained at temperatures below the transition temperature and about 225° F. For this purpose, these cavities are provided with suitable heating units 35, 36, 37 and 38, adapted for control of proper temperature. After the thermoplastic material has sufficiently cooled in the respective die cavities 31 through 34, it may be subjected to a quenching operation, such as described above, to produce a finished molded article substantially free from deleterious orientation and which will not result in cracking or other structural impairment in the course of performing its function.

As an example, illustrating the advantages obtained in producing improved molded articles by the process of the present invention, the following injection molding operation is conducted employing polytrifluorochloroethylene thermoplastic having an N. S. T. of about 300° C. Into the injection chamber, having an 8-ounce capacity, are fed 28.2 grams of the polytrifluorochloroethylene thermoplastic. This material is preheated to a temperature of about 300° F., in feed hopper 10, and is then permitted to enter the injection cylinder 12, which is maintained at a temperature of about 525–540° F. The heated thermoplastic material is permitted to remain in the injection chamber until it slowely oozes out of the nozzle 16. The pressure is then increased in the cylinder by means of plunger 20 until a full "shot" is obtained. The required pressure may vary from about 5,000 pounds per square inch to as high as about 45,000 pounds per square inch, depending upon the state of plasticization of the thermoplastic material and the shape of the die cavity to be filled. The heated thermoplastic material from the injection chamber, is thus forced through the heated nozzle 16, maintained at a temperature of about 575° F. to about 590° F., by means of heating unit 19, as previously described. The thus-heated thermoplastic material is next forced through the sprue bushing 41 into the main runner and connecting feed runners, which are maintained at a temperature of about 525° F. This is achieved by bringing hot runner plates 27 and 28 up to the required temperature of 525° F. by means of heating units 29 and 30. The thus heated material in the respective feed runners is next forced into the respective die cavities 31 through 34, which are maintained at a temperature of approximately 300° F., by means of heating units 35 through 38 in cavity plates 39 and 40. Backing plates 42 and 43 are employed to support each half of the die. It is found that orifice sizes from .020 inch to .125 inch can be employed; however, the best molded articles, having the least amount of orientation are obtained, employing the process of this invention, with an orifice of .125 inch. A typical molding cycle, employing the present process, runs from approximately 10 seconds to approximately 3 minutes. In general, however, most molding operations can be accomplished in a run from approximately 20 seconds to approximately 1 minute.

For comparative purposes, to show the advantages obtained employing the improved injection molding process of the present invention, approximately 250 molded cones, comprising a thermoplastic polymer of polytrifluorochloroethylene having an N. S. T. of about 300° C., were obtained by a conventional injection molding operation, employing a Fellows 8-ounce injection machine cylinder. Each of these molded cones was subsequently subjected to tension or stress, with an Instron Tester, by samples taken parallel and perpendicular to the axis of the cone. The group, therefore, comprises samples which had cracked either spontaneously or when subjected to accelerated aging tests. An arbitrary orientation index of 1 to 5 was adopted to define the degree of orientation (5=maximum orientation). More than 75 percent of all the cracked samples tested, show a high degree of orientation (orientation index=4 or 5). Employing the process and the apparatus of the present invention, a similar number of molded cones, examined, revealed that approximately 75 percent of the uncracked samples, when subjected to the aforementioned tests, had a low orientation (orientation index=1 or 2). It is, therefore, conclusively shown that the hot runner system, of the present invention, results in producing a finished molded article of polytrifluorochloroethylene thermoplastic, having a low orientation, and, therefore, of improved quality.

Since certain changes may be made in carrying out the above method, and in the apparatus employed, without departing from the scope of the invention, it is intended that all matter contained in the above description shall be interpreted as illustrative and not in a limiting sense.

I claim:

1. In a process for the injection molding of a thermoplastic material comprising a polymer of trifluorochloroethylene having an N. S. T. between about 200° C. and about 350° C. and a transition point of about 415° F. in which said material is injected from an injection chamber through a central main-runner and from said main-runner through a plurality of feed-runners extending into a plurality of die cavities, the improvement which comprises heating said feed-runners to a temperature sufficient to maintain said material sufficiently above said transition point to avoid substantial orientation and below the temperature of substantial degradation.

2. In a process for the injection molding of a thermoplastic material comprising a polymer of trifluorochloroethylene having an N. S. T. between about 200° C. and about 350° C. and a transition point of about 415° F. in which said material is injected from an injection chamber through a central main-runner and from said main-runner through a plurality of feed-runners extending into a plurality of die cavities, the improvement which comprises heating said feed-runners to a temperature sufficient to maintain said material sufficiently above said transition point and above 475° F. to avoid substantial orientation and below 550° F.

References Cited in the file of this patent

UNITED STATES PATENTS

| | | |
|---|---|---|
| 2,448,676 | MacMillin | Sept. 7, 1948 |
| 2,542,263 | Schultz | Feb. 20, 1951 |
| 2,551,439 | Kovacs | May 1, 1951 |
| 2,617,151 | Rubin | Nov. 11, 1952 |